(12) United States Patent
Qu et al.

(10) Patent No.: US 8,152,545 B1
(45) Date of Patent: Apr. 10, 2012

(54) CARD CONNECTOR

(75) Inventors: Zhi-Cheng Qu, New Taipei (TW);
Bing-Tao Yang, New Taipei (TW);
Yin-Lung Wu, New Taipei (TW);
Ming-Chiang Chen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/186,137

(22) Filed: Jul. 19, 2011

(51) Int. Cl.
*H01R 29/00* (2006.01)
(52) U.S. Cl. .................. 439/188; 439/159; 439/630
(58) Field of Classification Search .............. 439/188, 439/159, 630
See application file for complete search history.

(56) References Cited

U.S. PATENT DOCUMENTS

| | | | | |
|---|---|---|---|---|
| 5,877,488 | A * | 3/1999 | Klatt et al. .................. | 235/486 |
| 6,471,550 | B2 * | 10/2002 | Maiterth et al. ............. | 439/631 |
| 6,478,592 | B1 * | 11/2002 | Hu et al. .................... | 439/159 |
| 6,623,304 | B2 * | 9/2003 | Harasawa et al. ........... | 439/630 |
| 6,935,898 | B2 * | 8/2005 | Lai ............................ | 439/630 |
| 7,029,306 | B2 * | 4/2006 | Bilcauu et al. ............. | 439/326 |
| 7,364,468 | B2 * | 4/2008 | Liu et al. .................... | 439/638 |
| 7,425,157 | B1 * | 9/2008 | Hung ........................ | 439/630 |
| 7,507,098 | B1 * | 3/2009 | Hung ........................ | 439/159 |
| 7,530,852 | B2 * | 5/2009 | Hu et al. .................... | 439/630 |
| 7,556,534 | B1 * | 7/2009 | Ho ........................... | 439/630 |
| 7,563,138 | B2 * | 7/2009 | Zhang et al. ............... | 439/630 |
| 7,789,709 | B1 * | 9/2010 | He et al. .................... | 439/630 |
| 7,871,298 | B2 * | 1/2011 | Guo et al. .................. | 439/630 |
| 7,896,671 | B2 * | 3/2011 | Kim et al. .................. | 439/188 |
| 7,938,656 | B2 * | 5/2011 | Hu ............................ | 439/159 |
| 8,038,477 | B2 * | 10/2011 | Zhang ....................... | 439/630 |

* cited by examiner

*Primary Examiner* — Tulsidas C Patel
*Assistant Examiner* — Vladimir Imas
(74) *Attorney, Agent, or Firm* — WPAT, P.C.; Anthony King

(57) ABSTRACT

A card connector includes an insulating housing defining a first receiving chamber and a second receiving chamber, a monitoring terminal fastened in one side of the insulating housing and having a contact plate, a first switch terminal fastened in the one side of the insulating housing and having a first pressing arm slantwise extending into the first receiving chamber and a first contact portion formed at a distal end of the first pressing arm for elastically contacting the contact plate by means of pressing the first pressing arm sideward, and a second switch terminal fastened in the one side of the insulating housing and having a second pressing arm slantwise stretching into the second receiving chamber and a second contact portion formed at a distal end of the second pressing arm for elastically contacting the contact plate by means of pressing the second pressing arm sideward.

9 Claims, 4 Drawing Sheets

CARD CONNECTOR

BACKGROUND OF THE INVENTION

1. Field of the Invention

The present invention relates to a card connector, and more particularly to a card connector capable of receiving two kinds of different electronic cards therein.

2. The Related Art

With the development of electronic technology, various electronic cards are widely used in electronic products, such as digital cameras, personal digital assistants (PDA) and mobile phones etc. The conventional electronic product defines a card connector so as to receive an electronic card therein. At present, the card connector is improved to often receive two or more kinds of different electronic cards. However, when each kind of electronic card is inserted into the card connector, a group of monitoring terminals is needed to monitor whether the corresponding electronic card is inserted in the card connector in place or not. As a result, the insertion of different kind of electronic card need be monitored by different group of monitoring terminals, and all groups of the monitoring terminals occupy a large space in the card connector. Furthermore, it takes a relatively high manufacture cost.

SUMMARY OF THE INVENTION

An object of the present invention is to provide a card connector adapted for receiving two kinds of cards therein. The card connector includes an insulating housing defining a first receiving chamber for receiving one card therein and a second receiving chamber separated from the first receiving chamber by a partition for receiving the other card therein, a plurality of first and second electrical terminals disposed in the insulating housing and respectively stretching into the first receiving chamber and the second receiving chamber for electrically contacting the corresponding card, and a monitoring terminal group including a first switch terminal, a second switch terminal and a monitoring terminal. The monitoring terminal has a fastening strip fastened in one side of the insulating housing and a contact plate. The first switch terminal has a first fastening plate fastened in the one side of the insulating housing, a first pressing arm slantwise extending into the first receiving chamber and a first contact portion formed at a distal end of the first pressing arm and capable of elastically contacting the contact plate of the monitoring terminal under the action of the one card pressing sideward the first pressing arm. The second switch terminal has a second fastening plate fastened in the one side of the insulating housing between the second receiving chamber and the monitoring terminal, a second pressing arm slantwise stretching into the second receiving chamber and a second contact portion formed at a distal end of the second pressing arm and capable of elastically contacting the contact plate of the monitoring terminal under the action of the other card pressing sideward the second pressing arm.

As described above, the card connector of the present invention utilizes the monitoring terminal to be shared by the first switch terminal and the second switch terminal so as to respectively monitor whether the cards are inserted in the card connector in place or not. Therefore, it can effectively save a space occupied by the monitoring terminal group in the card connector, and take a relatively low manufacture cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
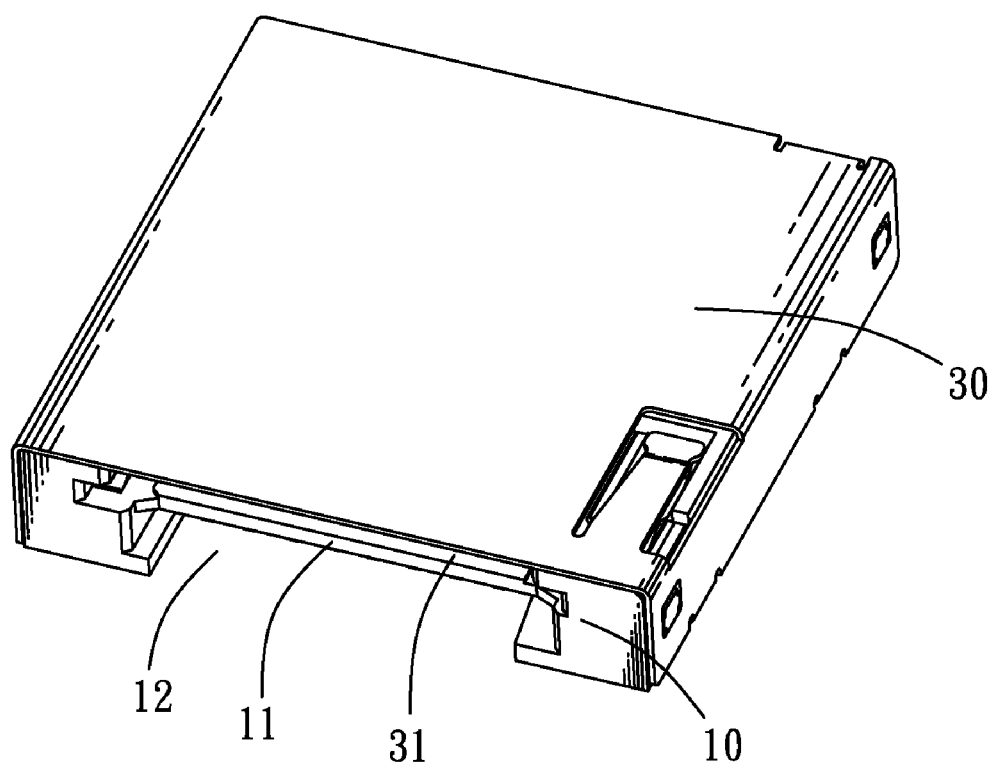
FIG. 1 is an assembled perspective view of a card connector in accordance with an embodiment of the present invention.
Figure 3:
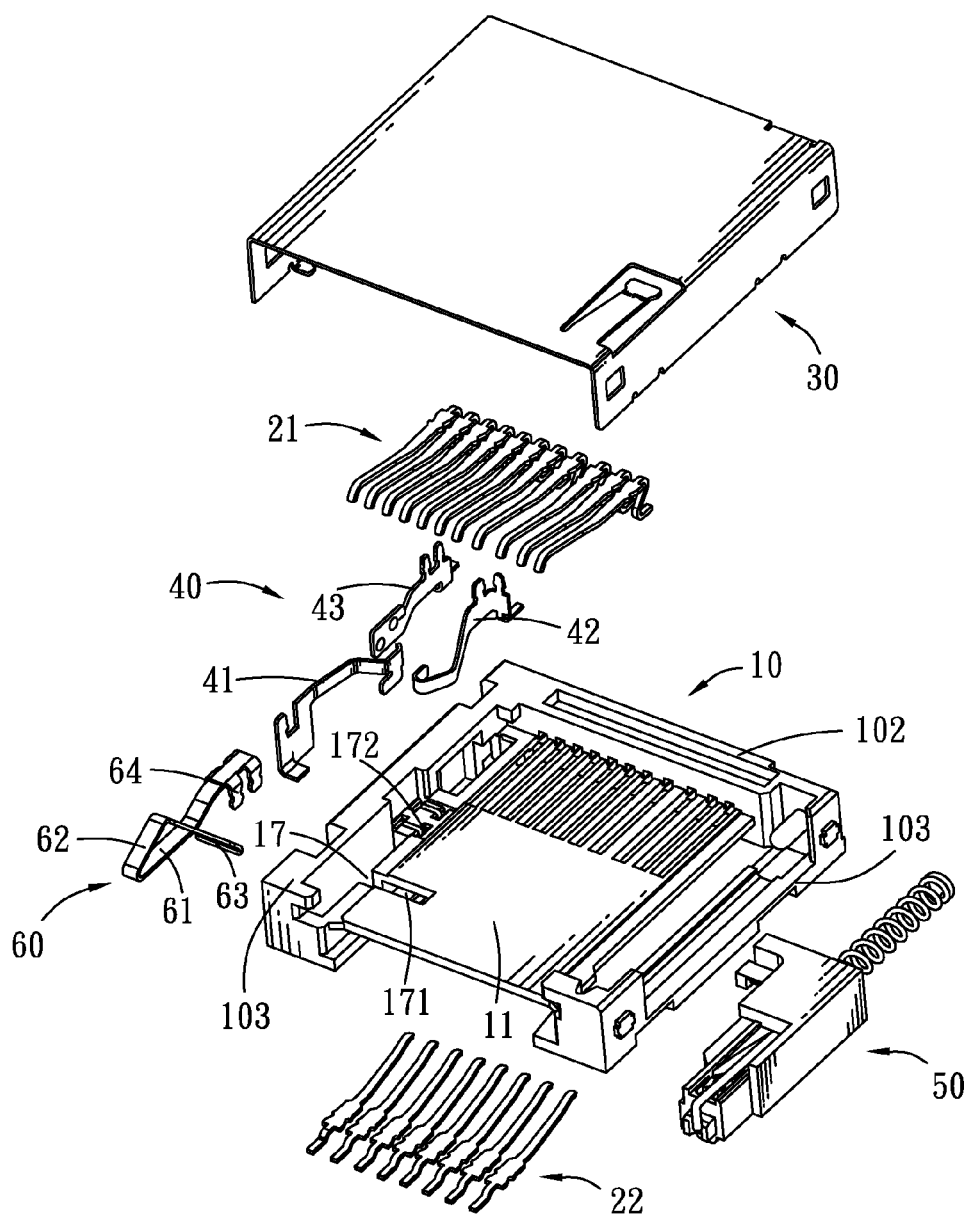
FIG. 3 is another exploded perspective view of the card connector of FIG. 1.

Referring to FIG. 1 and FIG. 3, a card connector in accordance with an embodiment of the present invention includes an insulating housing 10, a plurality of first electrical terminals 21 and second electrical terminals 22, a monitoring terminal group 40, an ejecting device 50, a fool-proofing member 60 and a cover 30.

Figure 4:
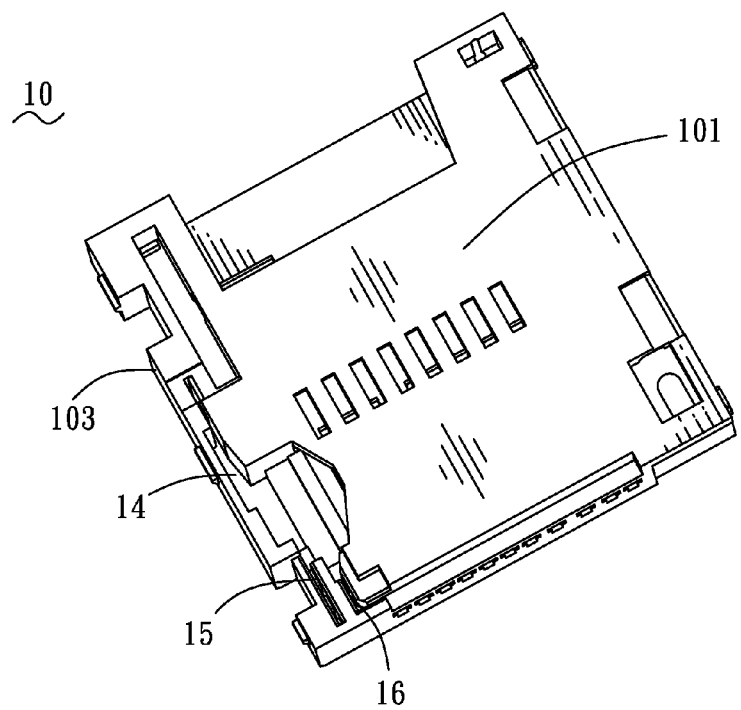
FIG. 4 is a perspective view of an insulating housing of the card connector of FIG. 1.

Referring to FIG. 1, FIG. 3 and FIG. 4, the insulating housing 10 has a rectangular base board 101, a rear wall 102 protruding upward from a rear end of the base board 101, and two opposite side walls 103 protruding upward from two opposite side edges of the base board 101 and connected with two ends of the rear wall 102. A rectangular partition 11 extends forward from a substantial middle of an inside of the rear wall 102 and apart parallel to the base board 101 to define a second receiving chamber 12 therebetween so as to receive a second electronic card (not shown) therein. A bottom of one side wall 103 has a substantial middle concaved upward to form a first fastening fillister 14, and a rear concaved upward to form a second fastening fillister 16 and a fastening groove 15 which are parallel to each other. The first fastening fillister 14, the second fastening fillister 16 and the fastening groove 15 each extend along a front-to-rear direction of the side wall 103 and further are connected with one another. The second fastening fillister 16 is further communicated with the second receiving chamber 12. A front of a top of the side wall 103 is concaved downward to form a fastening cavity 17 extending along the front-to-rear direction of the side wall 103. One side of the partition 11 defines a slot 171 vertically penetrating through the partition 11 and extending along a direction perpendicular to the front-to-rear direction to be connected with the fastening cavity 17. A bottom side of a rear of the fastening cavity 17 vertically defines a plurality of inserting holes 172.

Figure 2:
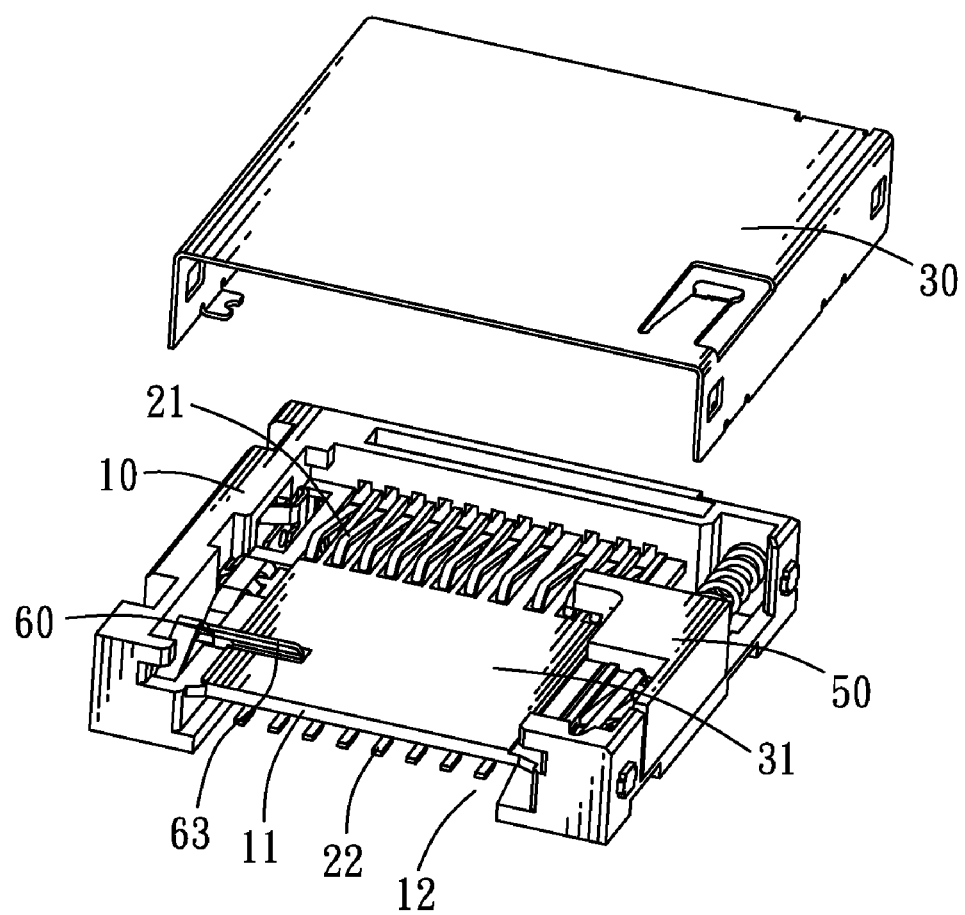
FIG. 2 is a partially exploded perspective view of the card connector of FIG. 1.

Referring to FIG. 1 and FIG. 2, the cover 30 is coupled to the insulating housing 10 to define a first receiving chamber 31 between the cover 30 and a top side of the partition 11 for receiving a first electronic card (not shown) therein. The first fastening fillister 14 is further connected with the first receiving chamber 31. The first electrical terminals 21 are assembled in a rear of the partition 11 at regular intervals and further project into the first receiving chamber 31. The second electrical terminals 22 are assembled in a front of the base board 101 at regular intervals and further project into the second receiving chamber 12. The ejecting device 50 is mounted in the other side wall 103 of the insulating housing 10 for ejecting the electronic cards out of the card connector.

Figure 5:
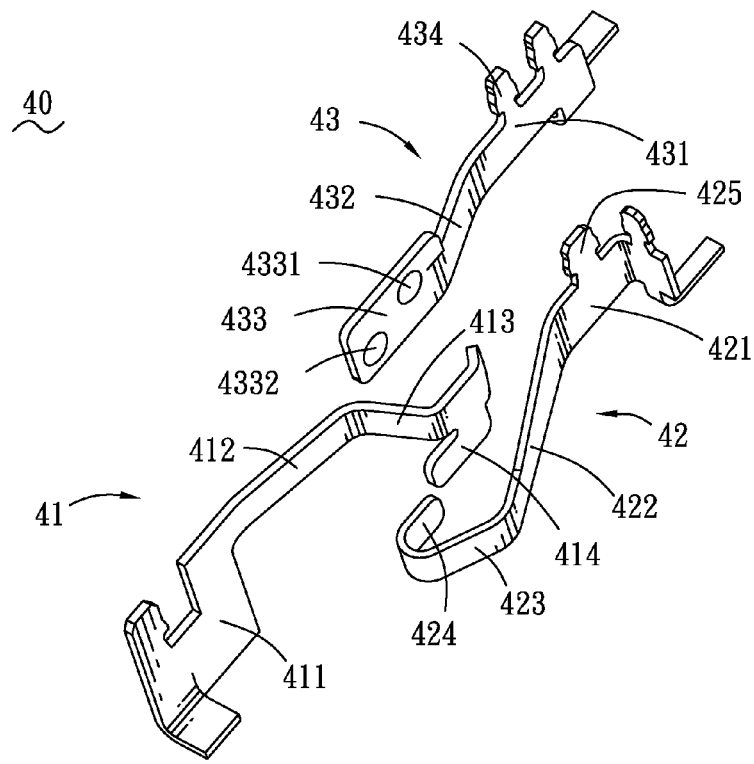
FIG. 5 is a perspective view of a monitoring terminal group of the card connector of FIG. 3.

Referring to FIG. 5, the monitoring terminal group 40 includes a first switch terminal 41, a second switch terminal 42 and a monitoring terminal 43. The first switch terminal 41 has a first fastening plate 411 secured in the first fastening fillister 14 of the insulating housing 10, a first elastic arm 412 extending rearward from a top of a rear edge of the first fastening plate 411 and inclined towards the first receiving chamber 31, a first pressing arm 413 further slantwise extending into the first receiving chamber 31 from a rear edge of the first elastic arm 412, and a first contact portion 414 formed at a free end of the first pressing arm 413. The second switch terminal 42 has a second fastening plate 421 secured in the second fastening fillister 16 of the insulating housing 10, a second elastic arm 422 extending forward from a front edge of the second fastening plate 421 and inclined towards the second receiving chamber 12, a second pressing arm 423 further extending forward from a front edge of the second elastic arm 422 and inclined oppositely to the second receiving chamber 12, and a second contact portion 424 bent rearward from a free end of the second pressing arm 423, wherein the second pressing arm 423 is further exposed in the second receiving chamber 12. A top edge of the second fastening plate 421 protrudes upward to form a fastening ear 425 inserted in a top side of the second fastening fillister 16. The monitoring terminal 43 has a fastening strip 431 fastened in the fastening groove 15 of the insulating housing 10, a connecting strip 432 extending forward from a front edge of the fastening strip 431 and inclined towards the second switch terminal 42, and a contact plate 433 extending forward from a free edge of the connecting strip 432. A first contact lump 4331 and a second contact lump 4332 are protruded on a side of the contact plate 433, and apart face the first contact portion 414 and the second contact portion 424 respectively. A top edge of the fastening strip 431 protrudes upward to form a plurality of fixing ears 434 inserted in a top side of the fastening groove 15.

Referring to FIG. 3 again, the fool-proofing member 60 has a strip-shaped fastening arm 61 fastened in the fastening cavity 17 of the insulating housing 10, a resilient arm 62 extending upward from a front edge of the fastening arm 61 and inclined towards the fastening arm 61, and a fool-proofing portion 63 extending sideward from a distal end of the resilient arm 62 to be movably received in the slot 171 of the partition 11 and further project beyond the top side of the partition 11 for blocking the first electronic card from being inserted into the first receiving chamber 31 when the second electronic card is received in the second receiving chamber 12. The resilient arm 62 projects upward in the first receiving chamber 31 so as to drive the fool-proofing portion 63 to move downward or upward when the first electronic card is inserted into the first receiving chamber 31 to press downward the resilient arm 62 or withdrawn out of the first receiving chamber 31 to set free the resilient arm 62. When the first electronic card is received in the first receiving chamber 31 of the insulating housing 10, the fool-proofing portion 63 is pressed downward to project beyond a bottom side of the partition 11 so as to block the second electronic card from being inserted into the second receiving chamber 12. Two opposite side edges of a rear of the fastening arm 61 protrude downward to form a plurality of inserting ears 64 inserted in the inserting holes 172 of the insulating housing 10 respectively.

Referring to FIGS. 1-5, in use, when the first electronic card is inserted into the first receiving chamber 31 of the insulating housing 10, the first electronic card presses sideward the first pressing arm 413 of the first switch terminal 41 to realize an electrical connection between the first contact portion 414 and the first contact lump 4331 of the monitoring terminal 43 so as to monitor whether the first electronic card is inserted in place. When the second electronic card is inserted into the second receiving chamber 12 of the insulating housing 10, the second electronic card presses sideward the second pressing arm 423 of the second switch terminal 42 to realize an electrical connection between the second contact portion 424 and the second contact lump 4332 of the monitoring terminal 43 so as to monitor whether the second electronic card is inserted in the place. So, the monitoring terminal 43 can be shared by the first switch terminal 41 and the second switch terminal 42 to respectively monitor the insertion of the first electronic card and the second electronic card.

As described above, the card connector of the present invention utilizes the monitoring terminal 43 to be shared by the first switch terminal 41 and the second switch terminal 42 so as to respectively monitor whether the first electronic card and the second electronic card are inserted in the card connector in place or not. Therefore, it can effectively save a space occupied by the monitoring terminal group 40 in the card connector, and take a relatively low manufacture cost.

What is claimed is:

1. A card connector adapted for receiving two kinds of cards therein, comprising:
    an insulating housing defining a first receiving chamber for receiving one card therein and a second receiving chamber separated from the first receiving chamber by a partition for receiving the other card therein;
    a plurality of first and second electrical terminals disposed in the insulating housing and respectively stretching into the first receiving chamber and the second receiving chamber for electrically contacting the corresponding card; and
    a monitoring terminal group including a first switch terminal, a second switch terminal and a monitoring terminal, the monitoring terminal having a fastening strip fastened in one side of the insulating housing and a contact plate, the first switch terminal having a first fastening plate fastened in the one side of the insulating housing, a first pressing arm slantwise extending into the first receiving chamber and a first contact portion formed at a distal end of the first pressing arm and capable of elastically contacting the contact plate of the monitoring terminal under the action of the one card pressing sideward the first pressing arm, the second switch terminal having a second fastening plate fastened in the one side of the insulating housing between the second receiving chamber and the monitoring terminal, a second pressing arm slantwise stretching into the second receiving chamber and a second contact portion formed at a distal end of the second pressing arm and capable of elastically contacting the contact plate of the monitoring terminal under the action of the other card pressing sideward the second pressing arm.

2. The card connector as claimed in claim 1, wherein the contact plate of the monitoring terminal has one side thereof designed with a first contact lump and a second contact lump thereon which apart face the first contact portion of the first switch terminal and the second contact portion of the second switch terminal so as to realize an electrical connection with the first contact portion and the second contact portion respectively.

3. The card connector as claimed in claim 2, wherein the monitoring terminal further has a connecting strip extending forward from a front edge of the fastening strip and inclined towards the second switch terminal, the contact plate is formed by extending forward from a front edge of the connecting strip.

4. The card connector as claimed in claim 3, wherein a top edge of the fastening strip protrudes upward to form a plurality of fixing ears inserted in the insulating housing.

5. The card connector as claimed in claim 1, wherein the first switch terminal further has a first elastic arm extending rearward from a top of a rear edge of the first fastening plate and inclined towards the first receiving chamber, the first pressing arm is formed by slantwise extending rearward from a rear edge of the first elastic arm.

6. The card connector as claimed in claim 1, wherein the second switch terminal further has a second elastic arm extending forward from a front edge of the second fastening plate and inclined towards the second receiving chamber, the second pressing arm is formed by further extending forward from a front edge of the second elastic arm and inclined oppositely to the second receiving chamber, the second contact portion is bent rearward from a free end of the second pressing arm.

7. The card connector as claimed in claim 6, wherein a top edge of the second fastening plate protrudes upward to form a fastening ear inserted in the insulating housing.

8. The card connector as claimed in claim 1, wherein one side of the partition of the insulating housing defines a slot extending along a direction perpendicular to an insertion direction of the card and penetrating through the partition to be connected with the receiving chambers, the card connector further includes a fool-proofing member which has a fastening arm fastened in a front of one side of the insulating housing, a resilient arm extending upward from a front edge of the fastening arm and inclined towards the fastening arm to project in the first receiving chamber, and a fool-proofing portion extending sideward from a distal end of the resilient arm to be movably received in the slot of the partition and further project beyond a top side of the partition for blocking the one card from being inserted into the first receiving chamber when the other card is received in the second receiving chamber, the fool-proofing portion projects beyond a bottom side of the partition under the drive of the one card being inserted into the first receiving chamber to press downward the resilient arm so as to block the other card from being inserted into the second receiving chamber.

9. The card connector as claimed in claim 8, wherein two opposite side edges of a rear of the fastening arm protrude downward to form a plurality of inserting ears inserted in the insulating housing respectively.

* * * * *